(12) United States Patent
Iyengar et al.

(10) Patent No.: US 11,099,905 B2
(45) Date of Patent: Aug. 24, 2021

(54) EFFICIENT REMOTE RESOURCE ALLOCATION WITHIN AN SMP BROADCAST SCOPE MAINTAINING FAIRNESS BETWEEN OPERATION TYPES

(71) Applicant: International Business Machines Corporation, Armonk, NY (US)

(72) Inventors: Arun Iyengar, Fishkill, NY (US); Michael A. Blake, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 257 days.

(21) Appl. No.: 16/285,328

(22) Filed: Feb. 26, 2019

(65) Prior Publication Data

US 2020/0272521 A1  Aug. 27, 2020

(51) Int. Cl.
*G06F 9/50* (2006.01)
*G06F 9/38* (2018.01)
*G06F 9/48* (2006.01)

(52) U.S. Cl.
CPC .......... *G06F 9/5038* (2013.01); *G06F 9/3891* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 6,038,651 A | 3/2000 | VanHuben et al. | |
| 6,360,263 B1* | 3/2002 | Kurtzberg | G06F 9/5027 709/200 |
| 6,738,871 B2 | 5/2004 | Van Huben et al. | |
| 6,738,872 B2 | 5/2004 | Van Huben et al. | |
| 6,782,535 B1* | 8/2004 | Dai-Santo | G06F 9/5044 710/54 |
| 7,085,897 B2 | 8/2006 | Blake et al. | |
| 7,111,130 B2 | 9/2006 | Blake et al. | |
| 7,844,758 B1 | 11/2010 | Hughes | |
| 8,762,651 B2 | 6/2014 | Blake et al. | |
| 8,918,587 B2 | 12/2014 | Bronson et al. | |
| 9,069,610 B2* | 6/2015 | Chakravorty | G06F 9/50 |
| 9,081,501 B2 | 7/2015 | Asaad et al. | |

(Continued)

OTHER PUBLICATIONS

Elliott et al. "Pipelined Cache Snooping Operations in a Multi-Processor System", IBM Technical Disclosure Bulletin, May 1994, pp. 387-388.*

(Continued)

*Primary Examiner* — Van H Nguyen
(74) *Attorney, Agent, or Firm* — Cantor Colburn LLP; Margaret McNamara

(57) ABSTRACT

Embodiments are provided for implementing efficient resource allocation maintaining fairness between operation types. Embodiments include receiving an operation, and determining a number of resources that are required for the received operation. Embodiments also include determining a number of available resources, comparing the number of required resources and the number of available resources, and allocating the available resources in a first mode or a second mode based at least in part on the comparison and a number of queued operations.

11 Claims, 7 Drawing Sheets

(56) References Cited

U.S. PATENT DOCUMENTS

| | | | |
|---|---|---|---|
| 9,363,154 B2* | 6/2016 | Akolkar | G06F 9/5005 |
| 9,417,920 B2 | 8/2016 | Tran | |
| 9,858,074 B2 | 1/2018 | Bradbury et al. | |
| 9,959,140 B2* | 5/2018 | Jackson | G06F 9/5027 |
| 10,095,543 B1 | 10/2018 | Griffin et al. | |
| 10,108,456 B2 | 10/2018 | Jain et al. | |
| 10,277,911 B2* | 4/2019 | Zenoni | G06F 9/5061 |
| 2009/0177845 A1 | 7/2009 | Moyer | |
| 2012/0096468 A1* | 4/2012 | Chakravorty | G06F 9/50 718/103 |
| 2014/0112339 A1 | 4/2014 | Safranek | |
| 2015/0052308 A1 | 2/2015 | Ray | |
| 2017/0214927 A1* | 7/2017 | Zenoni | H04N 19/156 |
| 2018/0365151 A1 | 12/2018 | Zoellin | |

OTHER PUBLICATIONS

Aldinucci; "Dynamic shared data in structured parallel programming frameworks"; Universita di Pisa Dipartimento di Informatica—Ph.D. Thesis: TD-09/03 (2017); 224 pages.

IBM; "Method and Apparatus for Cooperative State Prefetching in Clustered Shared Memory Multiprocessor Systems with Region Coherence Arrays"; IP.COM—IPCOM000180817D; Mar. 17, 2009; 7 pages.

IBM; "Method for Management of Protection and Address Translation Caches"; IP.COM—IPCOM000124844D; May 10, 2005; 3 pages.

Sorin et al.; "Specifying and Verifying a Broadcast and a Multicast Snooping Cache Coherence Protocol"; Copyright 2002 IEEE—Reprinted from IEEE Transactions on Parallel and Distributed Systems, vol. 13, Issue 6, Jun. 2002, pp. 556-578 (25 pages).

Zhang, Deli, et al., "Queue-Based and Adaptive Lock Algorithms for Scalable Resource Allocation on Shared-Memory Multiprocessors," International Journal of Parallel Programming 43, No. 5, 2015, pp. 721-751.

List of IBM Patents or Patent Applications Treated as Related; Date Filed: Feb. 26, 2019, 2 pages.

Iyengar et al.; "Simultaneous, Non-Atomic Request Processing Within an SMP Environment Broadcast Scope for Multiply-Requested Data Elements Using Real-Time Parallelization"; U.S. Appl. No. 16/275,436, filed Feb. 14, 2019.

Sorin et al., Specifying and verifying a broadcast and a multicast snooping cache coherence protocol, in IEEE Transactions on Parallel and Distributed Systems, vol. 13, No. 6, pp. 556-578, 2002.

* cited by examiner

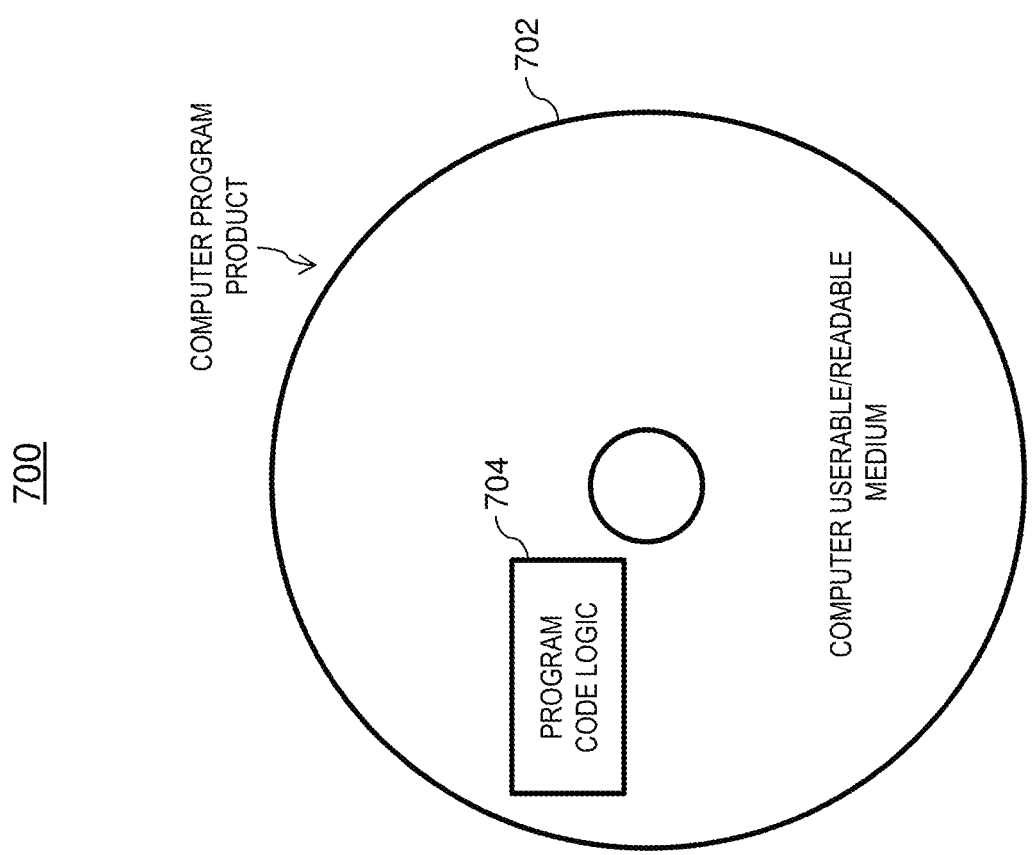

EFFICIENT REMOTE RESOURCE ALLOCATION WITHIN AN SMP BROADCAST SCOPE MAINTAINING FAIRNESS BETWEEN OPERATION TYPES

BACKGROUND

The present invention generally relates to resource management, and more specifically a system and method for efficient remote resource allocation within an SMP broadcast scope maintaining fairness between operation types.

Symmetrical multiprocessor (SMP) computer systems can perform processing of programs by multiple processors that may share a common operating system and memory. They range from coupling individual processors or processor clusters via a single shared system bus, to coupling processors together in a cluster, whereby the clusters communicate using a cluster-to-cluster interface, to a centrally interconnected network where parallel systems built around a large number of processors are interconnected via a central switch, such as a cross-bar switch. There may be a need to efficiently manage the remote resource allocation while maintaining fairness between different operation types when allocating various operation.

SUMMARY

Embodiments of the present invention are directed to a computer-implemented method for efficient remote resource allocation maintaining fairness between operation types. A non-limiting example of the computer-implemented method includes receiving an operation, and determining a number of resources that are required for the received operation. The computer-implemented method also includes determining a number of available resources, comparing the number of required resources and the number of available resources, and allocating the available resources in a first mode or a second mode based at least in part on the comparison and a number of queued operations.

Embodiments of the present invention are directed to a system for efficient remote resource allocation maintaining fairness between operation types. A non-limiting example of the system includes a storage controller and a storage medium, the storage medium being coupled to a processor. In some embodiments, the processor is configured to receive an operation, and determine a number of resources that are required for the received operation. The processor is also configured to determine a number of available resources, compare the number of required resources and the number of available resources, and allocate the available resources in a first mode or a second mode based at least in part on the comparison and a number of queued operations.

Embodiments of the invention are directed to a computer program product for efficient remote resource allocation maintaining fairness between operation types, the computer program product comprising a computer readable storage medium having program instructions embodied therewith. The program instructions are executable by a processor to cause the processor to perform a method. A non-limiting example of the method includes receiving an operation, and determining a number of resources that are required for the received operation. The method also includes determining a number of available resources, comparing the number of required resources and the number of available resources, and allocating the available resources in a first mode or a second mode based at least in part on the comparison and a number of queued operations.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 7 depicts a computer program product in accordance with one or more embodiments of the invention.

Figure 1:
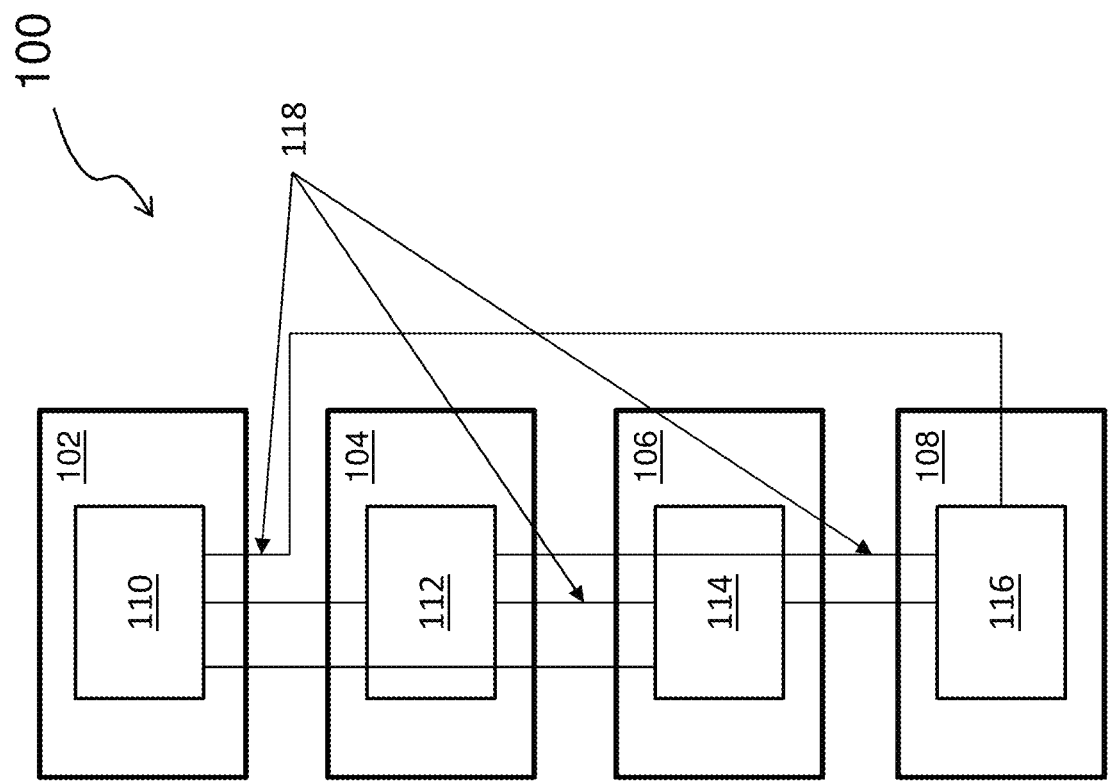
FIG. 1 depicts a block diagram of a distributed symmetric multiprocessing (SMP) system in accordance with one or more embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, Storage Controllers are tasked with processing data fetch and store requests to and from main memory from the Processors and I/O Adapters. Since the Storage Controller contains a shared higher level cache, which is architecturally invisible to the software and operating system, the Storage Controller is responsible for performing directory and cache accesses. All incoming requests enter a port on the Storage Controller, where they are received by a Central Processor Request Controller (CFAR) or I/O Request Controller. These controllers generate requests into a Central Priority unit which arbitrates among them and chooses one of the requesters to enter into one of one or more multistage Pipelines based on the address or other operation characteristic. During each stage of the pipeline the requestor may access and/or reserve various resources such as access to the cache, the Local Cache Fetch/Store Controllers, the data path controls, data path first-in-first-out (FIFO) buffers, the Remote Cache Fetch/Store Controllers, etc. As requests exit the pipeline, one of the Local Fetch/Store Controllers may assume responsibility for managing the operation through completion. Often this requires additional passes through the pipeline, which can add delay to the completion of a request.

As requests exit the pipeline, one of the Local Fetch/Store Controllers assumes responsibility for managing the operation through completion. Often this requires additional passes through the pipeline, therefore a Local Fetch/Store Controller must also participate in Central Priority arbitration and is also considered a requester. However, in the event the resource is unavailable the request/operation can be queued until the resource is made available. In addition, the request/operation can be further delayed due to an operation-type and/or priority that it is associated with.

The techniques described herein provide for a fair allocation of remote resources without preventing operations requiring a different number of resources from ever being processed. These techniques reduce the processing latency and also reduce the number of passes through the pipeline(s) for a single operation that is attempting to obtain a resource for processing while maintaining fairness among various operation types.

The remote resource management scheme that are implemented among one or more storage controllers must take care to ensure that these resources are fairly distributed among the operations which require the resources such that operations requiring two resources are not prevented from accessing the needed resources by a burst of operations requiring one resource. For example, if there is only one remote resource available, then an operation requiring two resources will not be able to access the resource and follow-through to completion. If the limit of remote resources is approached, and a pattern of a single remote resource being acquired/released is repeated, then completion of operations requiring two or more remote resources will be delayed indefinitely due to starvation of necessary remote resources they require.

Existing techniques are limited by only allowing operations to take the resource if there are at least two available resources. However, this is not optimal for scenarios with mostly one-RF (fixed resource) operations that do not utilize the last resource. For example, if operations are on a queue the last remote resource cannot be used by the head of queue even though no other operations can use it, unless 2 resources are made available. In many embodiments, it can be assumed that operations requiring multiple remote resources are almost always queueable.

The techniques that are described herein maintain fairness between one-RF and two-RF operations and increase the utilization of the last remote resource when fairness is not a concern. The techniques include switching between a one-RF operation and two-RF operation based on one or more factors to implement fairness to the various types of operations. The factors include but are not limited to the number of resources for the operation, available resources, type of resources, and the queued requests (type and location in queue).

Turning now to an overview of the aspects of the invention, one or more embodiments of the invention address the above-described shortcomings of the prior art by providing a flexible resource allocation in a first mode and a second mode based on the pending resources and the operation type.

In one or more embodiments of the invention, the L4 shared cache controller manages the resource allocation scheme. For example, when a local operation arrives at the L4 shared cache controller, the L4 shared cache controller determines the number of remote resources required for the operation and compares it to the number of remote resources available. If an appropriate number of resources are not available, then the operation may or may not be put on a resource serialization queue. Typically, operations requiring multiple remote resources are queued, and as resources become available, the queued operations are drained in a FIFO order.

In the event that there are no valid operations on the queue, the remote resources can be allocated to operations as they become available without restrictions. This is acceptable because it is known that there are no operations requiring two or more remote resources that are currently being unfairly starved, which guarantees fairness. The technical effects and benefits include improving the latency issues and overall processing efficiency for the SMP.

Turning now to a more detailed description of aspects of the present invention, FIG. 1 depicts a distributed symmetric multiprocessing (SMP) system 100 (hereafter "system 100") in accordance with one or more embodiments. System 100 can include 4 processing units or "drawers." Drawer 102 (described in greater detail with respect to FIG. 2) connects to drawer 104, drawer 106, and drawer 108 via a shared cache (SC) chip (sometimes referred to as an integrated circuit (IC)) 110. Drawers 104, 106, and 108 each have a respective SC chip (e.g., SC chip 112, SC chip 114, SC chip 116). Bus lines 118 connect drawers 102, 104, 106, and 108. Intra-drawer coherency communication may be performed using pass-through and a combination of these bus-lines, 118.

In an embodiment, cache lines that are owned or shared by processors of an entity at a level of coherency (cluster, CP Chip, drawer) are candidates to be handled at the level of coherency. Thus, if a processor of the entity requests ownership or sharing of a line that is already owned by a processor of the same entity (e.g., CP Chip or drawer), the entity need not access other entities to handle the request coherently. A request, for example, by a processor of a CP chip within a CP cluster, for sharing of a cache line is examined by the cache controller function to determine if the line is owned or shared by a processor of CP cluster. If it is already owned or shared, the cache controller handles the request within the CP cluster without accessing any other CP clusters. If the line is neither owned nor shared by a processor of CP cluster, the cache controller of the initial CP Cluster performs a cache coherency operation with the other CP chips on the other CP clusters connected to that SC chip or on the other drawers via the SC chips on those drawers.

Figure 2:
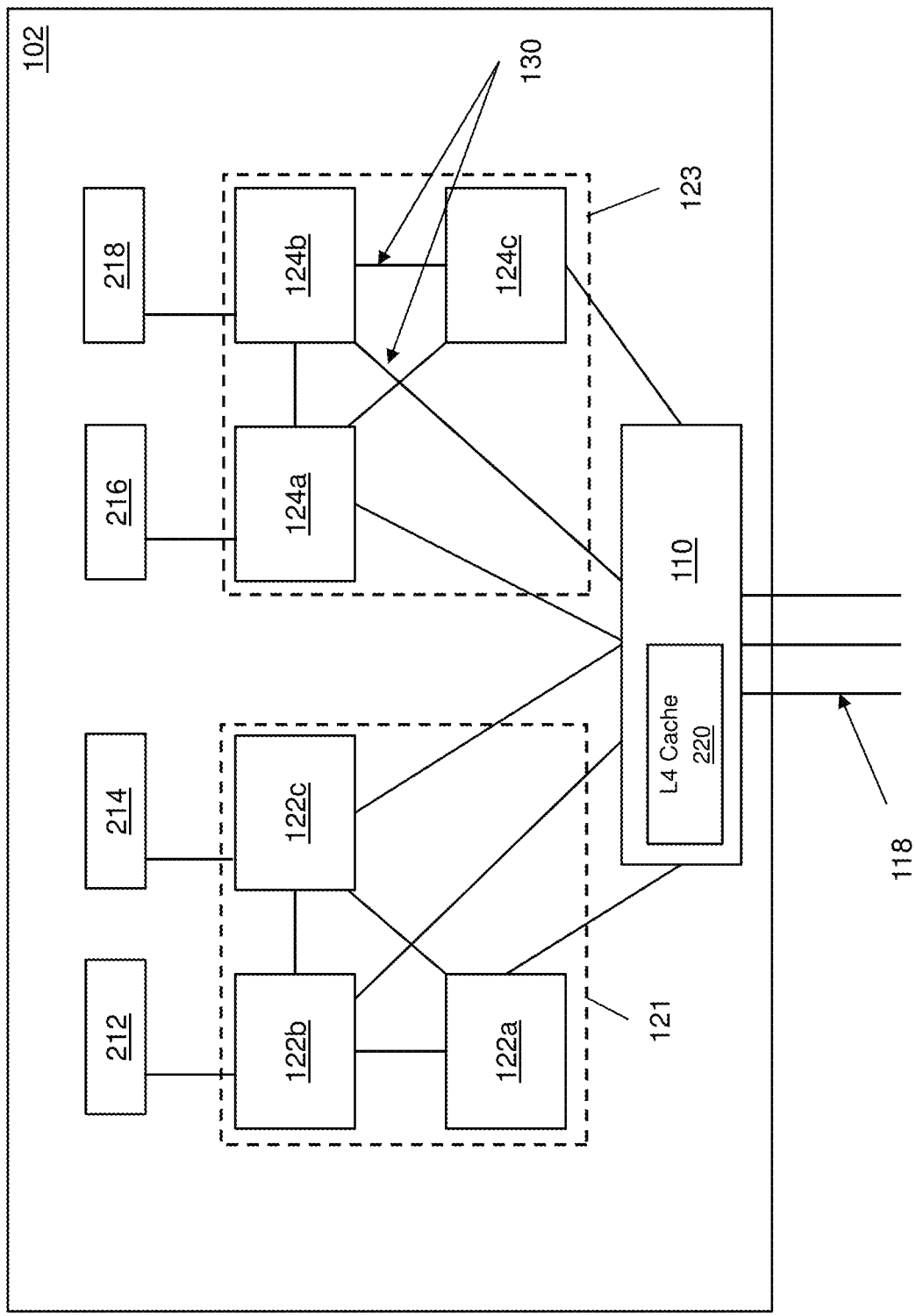
FIG. 2 depicts a block diagram of a drawer in a distributed symmetric multiprocessing (SMP) system in accordance with one or more embodiments of the invention.

FIG. 2 depicts drawer 102 in greater detail, according to one or more embodiments. Although FIG. 2 depicts only drawer 102, it should be appreciated that a similar configuration is contemplated for drawers 104, 106, and 108, and/or other drawers in system 100. Referring now to FIG. 2, drawer 102 includes two CP clusters (e.g., CP cluster 121 and CP cluster 123). Each CP cluster contains individual CP chips. For example, CP cluster 121 contains CP chips 122a, 122b, and 122c; and CP cluster 123 contains CP chips 124a, 124b, and 124c. Each of the individual CP chips (e.g., CP chips 122a, 122b, 122c, 124a, 124b, 124c) has multiple processing cores (e.g., 2 processing cores, 8 processing cores, 10 processing cores, etc.) and each processing core has its own private L1 and L2 cache. The processing cores within each individual CP chip share an L3 cache at the CP level. For example, the CP 122a includes multiple processing cores that each has its own L1/L2 cache and the multiple processing cores within the CP 121 share an L3 cache. Each respective CP chip may be connected to system memory (e.g., system memory 212, system memory 214, system memory 216, and system memory 218). CP chip 121 is operatively connected with each of the other clusters (e.g., 123) via bus lines 130 through the SC chip 110. In other aspects, a CP cluster may include any number of CP chips, although embodiments are described as having only three.

The SC chip 110 includes interconnects for communication with each CP chip (e.g., CP chips 122a, 122b, 122c, 124a, 124b, 124c) in both clusters 121, 123 on the drawer 102 and for communication with other SC chips on other drawers (e.g., the SC 112 of the drawer 104, the SC 114 of the drawer 106, the SC 116 of the drawer 108, etc.). In some embodiments, the SC chip 110 includes an L4 cache 220 and directory that includes the L4 cache and a directory of the state bits.

Figure 3:
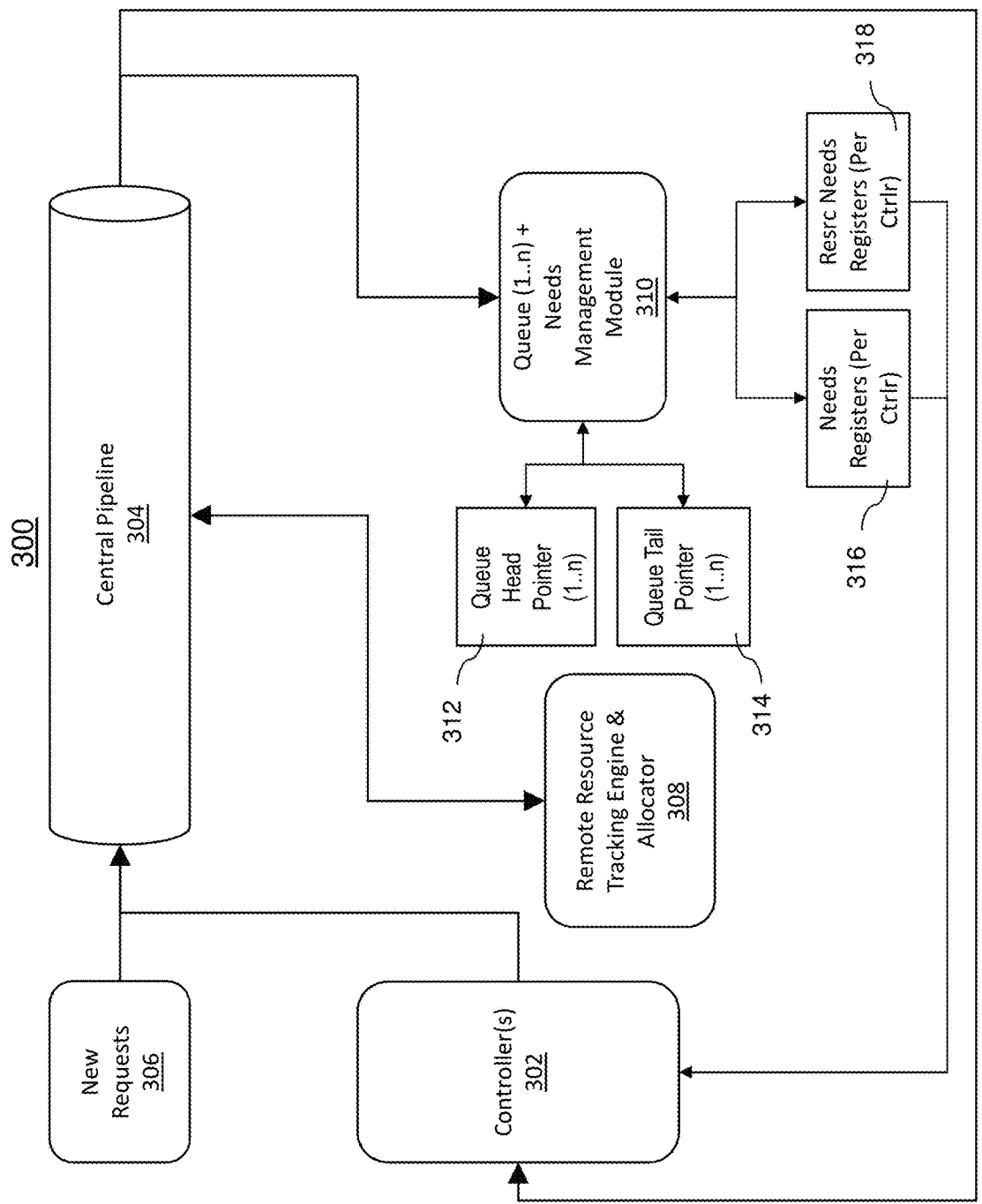
FIG. 3 depicts a system for efficient remote resource allocation maintaining fairness between operation types in accordance with one or more embodiments of the invention.

FIG. 3 depicts a system 300 for implementing efficient remote resource allocation within an SMP broadcast scope maintaining fairness between operation types. The system 300 includes a storage controller such as an L4 shared storage controller 302. The controller 302 is configured to manage storage requests and provide them to the central pipeline 304 for further processing. In one or more embodiments of the invention, the system 300 is configured to snoop the operation provided to the central pipeline 304. Block 306 represents the new requests that are received and snooped as the incoming request proceeds through the central pipeline 304.

Remote resource tracking engine and allocator 308 (hereinafter referred to as the "engine 308") is configured to maintain a count of the available remote resources. The engine 308 can track the number of remote resources that are used and allocate remote resources for new operations as they are freed and made available. The engine 308 that is coupled to the central pipeline 304 is configured to send a signal to the allocator to select a first mode or second mode responsive to the requested resources, available resources, and the type of operation, such as a 1-RF operation and a 2-RF operation. It is to be understood that other types of operations can be used in the techniques described herein and are not limited to the 1-RF operation and 2-RF operation in this example.

The queue needs management module 310 is configured to communicate with one or more components of the system 300 to control the allocation of the remote resources for each received operation. The queue head pointer 312 maintains a location of the head of the queue and updates the pointer as the data in the queue(s) is added and/or removed. The queue tail pointer 314 maintains a location of the end of the queue and updates the pointer as the data in the queue(s) is added and/or removed.

The queue management needs module 316 is coupled to the needs registers 316 and resource needs registers 318. The needs register 316 indicates a head of the queue or a controller ID for an operation that is associated with one or more queues. The resource needs register 318 indicates a particular pool or set of resources that are requested for an operation. The output of the needs register 316 and the resource needs registers 318 is provided to the controller 302 and determines which queued operation and/or request is provided to the central pipeline 304. In one or more in embodiments of the invention, it is determined with the current operation as a consequence of an already-active operation, such as a store putaway or move page store.

Figure 4:
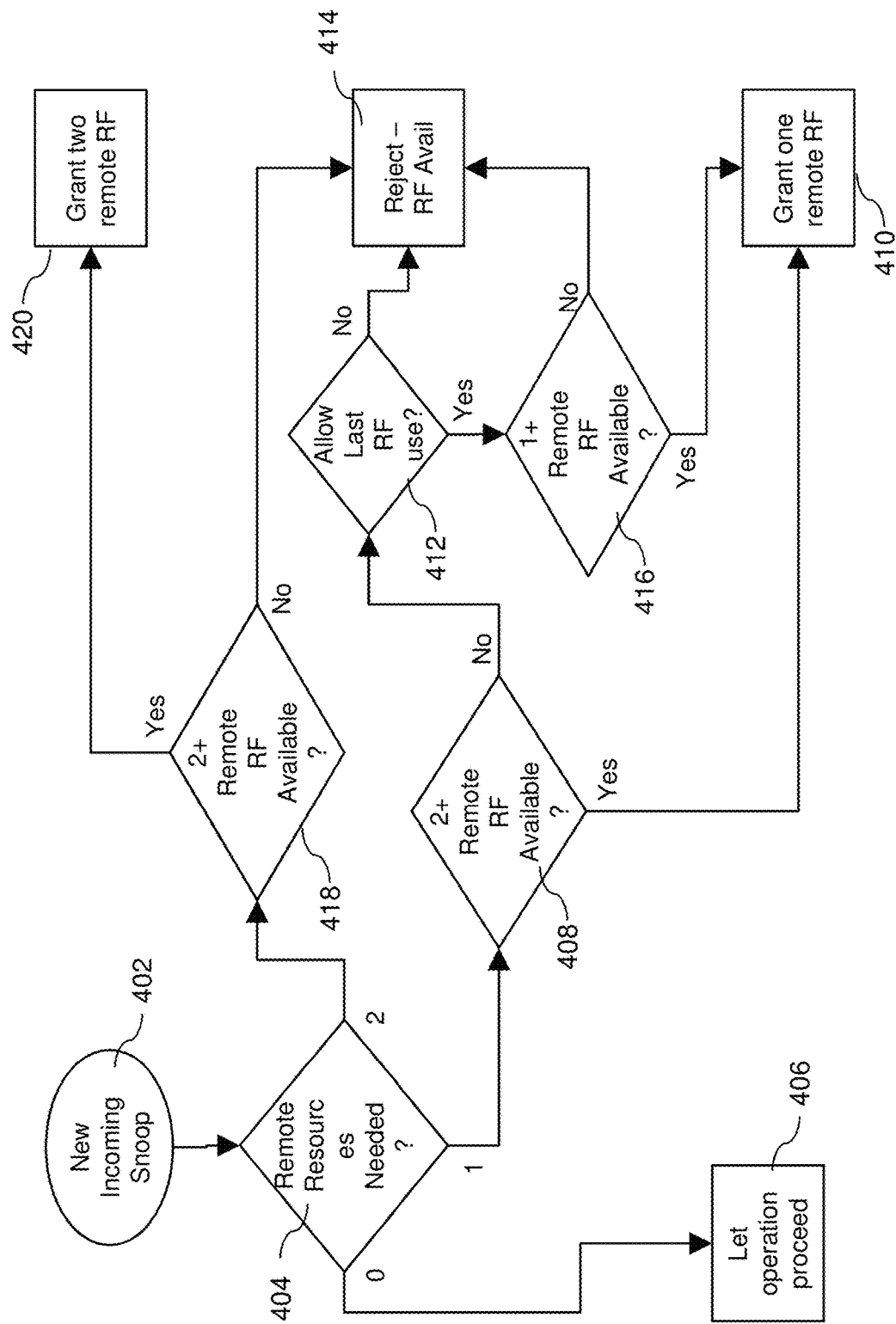
FIG. 4 depicts a flowchart of a method for allocating resources in accordance with one or more embodiments of the invention.

Now referring to FIG. 4, a process for allocating resources in accordance with one or more embodiments is shown. At block 402, the new incoming operation is snooped by the storage controller to determine the number of resources that are required for the incoming operation. At decision block

404, if the operation does not require any resources ("0" branch), the operation is allowed to proceed as shown at block 406.

If at block 406, the storage controller determines 1 remote resource is needed for the received operation, the process continues to block 408 to determine if 2 or more resources are available. If so ("Yes" branch), the process continues to block 410 and grants 1 remote resource to the operation. If not ("No" branch), the process proceeds to block 412 to determine if the last RF is allowed to be used. Further analysis for block 412 is provided with reference to FIG. 5 below.

If not ("No" branch), the resource allocation is rejected at block 414. If so ("Yes" branch), the process proceeds to block 416 to determine if one or more remote resources are available. If not ("No" branch), the allocation is rejected at block 414. If so ("Yes" branch), the process proceeds to block 410 to grant 1 remote resource.

Referring back to block 404, if it is determined that 2 or more resources are required ("2" branch), the process continues to block 418 to determine if 2 or more resources are available. If so ("Yes" branch), the process proceeds to block 420 and grants 2 remote resources for the operation. If not ("No" branch), the process continues to block 414 which rejects the allocation of resources to the operation. Although the method 400 is directed towards one-RF and two-RF operations where the resource tracking levels include 1-resource-available and 2-resource-available, respectively, it should be understood that embodiments having various categories of operations "C" requiring any number of resources "$N_c$" can be used and is not limited by the example provided above. In a non-limiting example, three categories of operations can be used where the first category of operations can include a one-remote resource category ($C_0=1$), a 3 remote resources category ($C_1=3$), and a 5 remote resources category ($C_2=5$). The resource tracking levels in this example can include 1-resource-available, 3-resources-available, and 5-resources available, respectively. The associated resource tracking logic can be scaled to generate a plurality of outputs "$N_c$-remaining."

Figure 5:
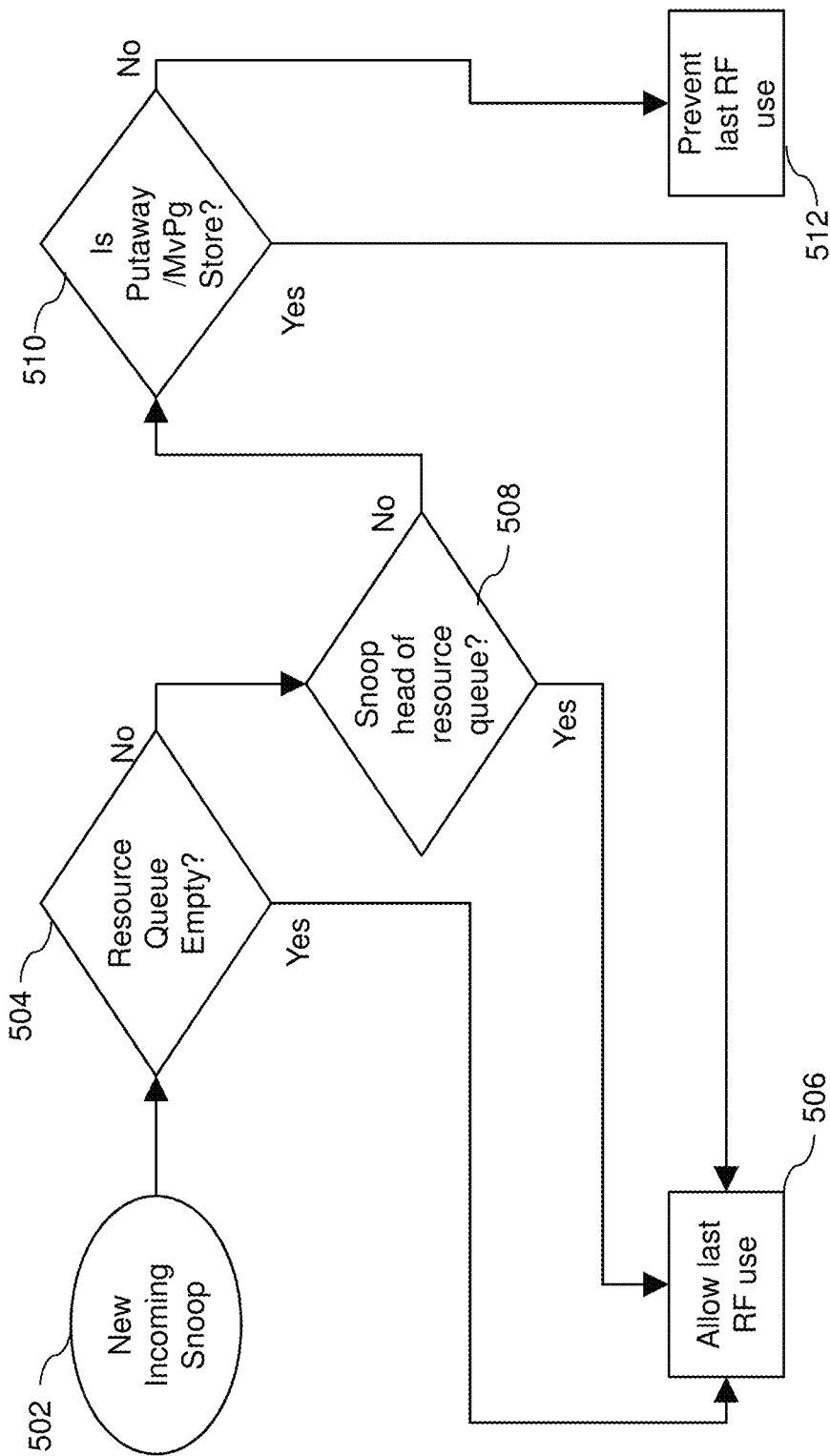
FIG. 5 depicts a flowchart of another method for allocating a last resource in accordance with one or more embodiments of the invention.

Now referring to FIG. 5, a process for allocating the last resource is shown. The incoming operation is snooped by the storage controller at block 502. At block 504 the storage controller determines whether the resource queue is empty. If it is determined that the resource queue is empty ("Yes" branch), the process proceeds to block 506 and the last resource is allowed to be allocated to the operation. If not ("No" branch), the process proceeds to block 508 to determine whether the current operation being snooped is, itself, the head of the resource queue.

If not ("No" branch), the process proceeds to block 510 to determine if the operation is a putaway/move page store operation. That is, if the type of operation is determined to be an operation that is a consequence of a previous operation. If so ("Yes" branch), the last resource is allowed to be used. Otherwise ("No" branch), the process proceeds to block 512 and prevents the allocation of the last resource RF.

Returning to block 508, if the operation is the head of the queue of the resource queue ("Yes" branch), the last resource is allowed to be allocated to the operation at block 506.

Figure 6:
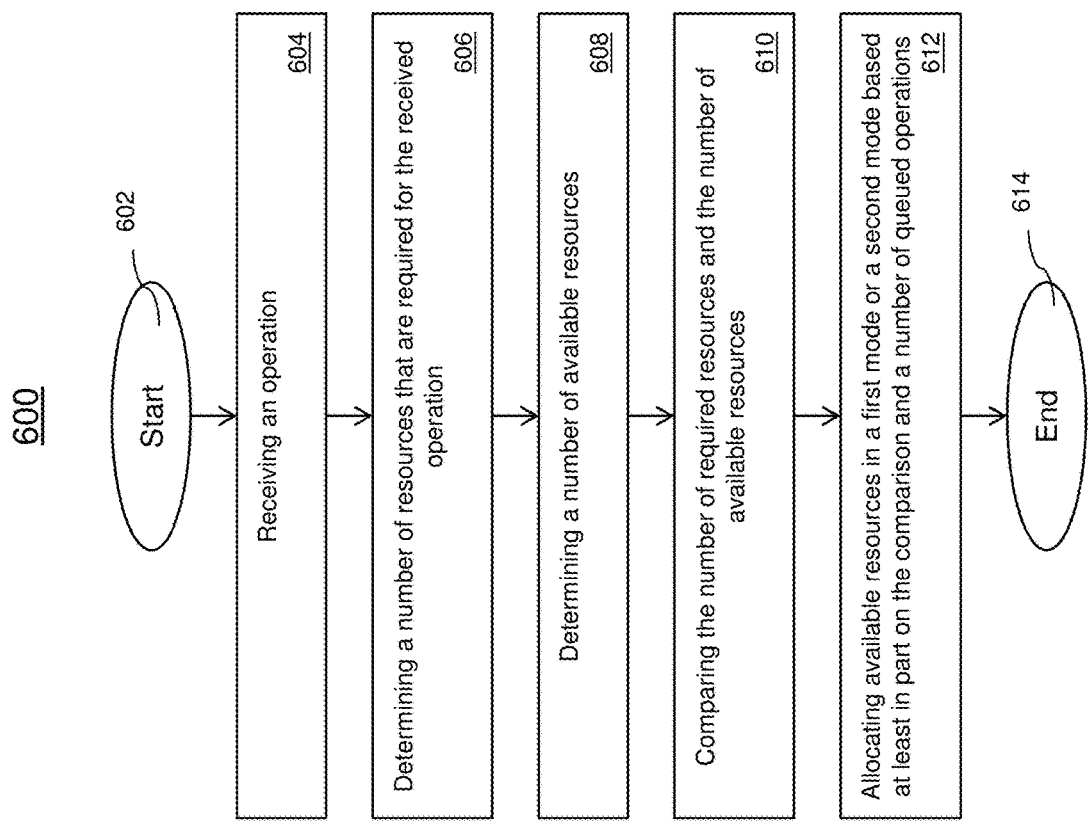
FIG. 6 depicts a flowchart of a method for performing efficient remote resource allocation maintaining fairness between operation types in accordance with one or more embodiments of the invention.

Now referring to FIG. 6, a flowchart of a method 600 for performing efficient remote resource allocation maintaining fairness between operation types is shown. The method 600 begins at block 602 and proceeds to block 604 which provides for receiving, at a storage controller, an operation. In one or more embodiments of the invention, an L4 shared storage controller receives an operation. Block 606 provides for determining a number of resources that are required for the received operation. The method 600 at block 608 provides for determining a number of available resources. In one or more embodiments, the number of available resources are maintained by the counter such as in engine 308. Block 610 provides for comparing the number of required resources and the number of available resources. Block 612 provides for allocating last available resource of the number of available resources in a first mode or a second mode based at least in part on the comparison and a number of queued resources. The method 600 ends at block 614.

Referring now to FIG. 7, a computer program product 700 in accordance with an embodiment that includes a computer-readable storage medium 702 and program instructions 704 is generally shown.

The techniques described herein allow for the variable allocation of remote resources based on real-time fairness information to maximize remote controller utilization while ensuring that fairness is not violated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for efficient resource allocation maintaining fairness between operation types, the method comprising:
    receiving, at a storage controller, an operation;
    determining a number of resources that are required for the received operation;
    determining a number of available resources;
    comparing the number of required resources and the number of available resources;
    allocating the available resources in one of a plurality of modes comprising a first mode and a second mode, based at least in part on the comparison and a number of queued operations;
    based on a determination that the operation requires one resource, determining whether a resource queue is empty;
    responsive to a determination that the resource queue is empty, allocating the available resources in a first mode wherein the first mode allows a last single resource to be allocated;
    responsive to a determination that the resource queue is not empty, snooping a head of the resource queue, and allocating the available resources in the first mode responsive to the head of the resource queue;
    responsive to snooping the head of the resource queue, determining whether a queued operation is a consequence of a previously initiated operation;
        based on a determination that the queued operation is the consequence of the previously initiated operation, allocating the available resources in the first mode;
        otherwise, preventing allocation of the available resources.

2. The computer-implemented method of claim 1, further comprising:
    based on a determination that the operation requires two resources, allocating the available resources in the second mode, wherein the second mode only allows resources to be allocated based on a determination that two or more resources are available.

3. The computer-implemented method of claim 1, wherein the received operation includes a request for a remote resource.

4. The computer-implemented method of claim 1, further comprising maintaining a count of the number of available resources using a counter.

5. A system for performing efficient resource allocation maintaining fairness between operation types, the system comprising:
a storage controller;
a storage medium, the storage medium being coupled to a processor;
the processor configured to:
receive an operation;
determine a number of resources that are required for the received operation;
determine a number of available resources;
compare the number of required resources and the number of available resources;
allocate the available resources in one of a plurality of modes, comprising a first mode and a second mode based at least in part on the comparison and a number of queued operations;
determine whether a resource queue is empty;
responsive to a determination that the resource queue is empty, allocate the available resources in a first mode, wherein the first mode allows a last single resource to be allocated;
responsive to a determination that the resource queue is not empty, snoop a head of the resource queue, and allocate the last resource in the first mode responsive to the head of the resource queue;
wherein responsive to snooping the head of the resource queue, determine whether a queued operation is a consequence of a previously initiated operation;
based on a determination that the queued operation is the consequence of the previously initiated operation, allocate the available resources in the first mode;
otherwise, prevent allocation of the available resources.

6. The system of claim 5, wherein based on a determination that the operation requires two resources, the processor is configured to allocate the available resources in the second mode, wherein the second mode only allows resources to be allocated based on a determination that two or more resources are available.

7. The system of claim 5, wherein the received operation includes a request for one or more remote resources.

8. The system of claim 5, further comprising a counter to maintain a count of the number of available resources.

9. A computer program product for performing efficient resource allocation maintaining fairness between operation types, the computer program product comprising a computer-readable storage medium having program instructions embodied therewith, the program instructions executable by a processor to cause the processor to:
receive an operation;
determine a number of resources that are required for the received operation;
determine a number of available resources;
compare the number of required resources and the number of available resources;
allocate the available resources in one of a plurality of modes, comprising a first mode and a second mode based at least in part on the comparison and a number of queued operations;
determine whether a resource queue is empty based on a determination that the operation requires one resource;
responsive to a determination that the resource queue is empty, allocate the available resources in a first mode, wherein the first mode allows a last single resource to be allocated;
responsive to determining the queue is not empty, snoop a head of the resource queue; and allocate the last resource in the first mode responsive to the head of the resource queue;
wherein responsive to snooping the head of the resource queue, determine whether a queued operation is a consequence of a previously initiated operation;
based on a determination that the queued operation is the consequence of the previously initiated operation, allocate the available resources in the first mode;
otherwise, prevent allocation of the available resources.

10. The computer program product of claim 9, wherein based on a determination that the operation requires two resources, the instructions are further executable by the processor to cause the processor to allocate the available resources in the second mode, wherein the second mode only allows resources to be allocated based on a determination that two or more resources are available.

11. The computer program product of claim 9, wherein the instructions are further executable by the processor to cause the processor to maintain a count of the number of available resources.

* * * * *